Patented Mar. 1, 1932

1,847,514

UNITED STATES PATENT OFFICE

RICHARD HERZ, OF FRANKFORT-ON-THE-MAIN, AND MAX SCHUBERT AND WERNER ZERWECK, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

2-MERCAPTO-ARYLENE-THIAZOLE COMPOUNDS AND PROCESS OF MAKING SAME

No Drawing. Application filed February 15, 1929, Serial No. 340,328, and in Germany February 23, 1928.

Our present invention relates to 2-mercapto-arylene-thiazoles of the probable formula:

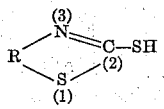

wherein R means an arylene residue which may contain further substituents, as for instance halogen, alkyl-, alkoxy-, amino-, arylamino- or acyl-amino- groups, and to a process of making same. This process consists in acting with a thiocarbonic acid compound of the general formula

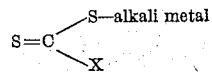

wherein X means -O-alkali metal, -S-alkali metal or -O-alkyl, either in situ or in substance in the presence of an alkali and advantageously with the addition of a reducing agent on an arylene thiazthionium compound of the probable general formula:

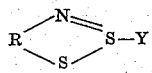

wherein Y means Cl or OH and R means an arylene residue which may contain further substituents (see U. S. Patent No. 1,637,023). As alkali sulfides act simultaneously as alkali and as reducing agents, further addition of alkali or of a reducing agent is not necessary in this case.

In order to apply the thio-carbonic acid compounds in situ for instance a trithio-carbonate may be substituted by carbon disulfide and alkali sulfide or a dithio carbonate by carbon disulfide and an alkali or a xanthogenate by carbon disulfide, alkali and alcohol.

It is a remarkable fact that the reaction is finished after a short time, in most cases already by warming the starting materials for some hours, and that completely pure products are obtained with an excellent yield in a smooth reaction.

The 2-mercapto-arylene-thiazoles most of which are new may be used for pharmaceutical purposes or as starting materials for the manufacture of dyestuffs or especially as vulcanizing accelerators.

In order to further illustrate our invention, the following examples are given, the parts being by weight and all temperatures in centigrade degrees. We wish it however to be understood that we are not limited to the particular products nor reaction conditions mentioned therein.

*Example 1*

25 parts of the reaction product of disulfur dichloride and para-phenetidine having probably the following constitution:

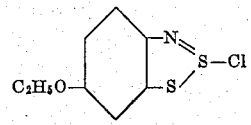

are introduced into a solution of 80 parts of crystallized sodium sulfide in 100 parts of water and to this mixture 25 parts of carbondisulfide are added. The mass becomes spontaneously warm and begins to separate colorless glittering crystals. The reaction is advantageously finished by warming the mass. Then the precipitated reaction product is filtered off and purified by dissolving it in a caustic alkali solution and again precipitating this solution with an acid. The new 2-mercapto-6-ethoxy-benzo-thiazole melts in a pure state at about 198° and corresponds probably to the formula:

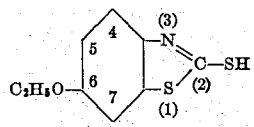

The same compound is obtained by grinding the starting material with alcohol, introducing the mass into a caustic soda solution advantageously mixed with dilute alcohol and hydrosulfite and working otherwise as described above.

Example 2

25 parts of the reaction product of disulfur-dichloride and ortho-toluidine of the probable formula:

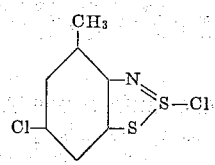

are treated with water as described in U. S. Patent No. 1,637,023. The conversion product of the probable formula:

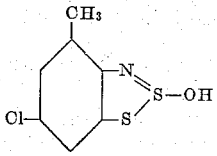

is introduced into 40 parts of a caustic soda solution of 36° Bé., advantageously with an addition of 240 parts of alcohol of 60% strength and about 10 parts of sodium hydrosulfite. Then 25 parts of carbon-disulfide are allowed to run in and the mass is heated under a reflux condenser for some time. After removing the alcohol by distillation the reaction product is precipitated by means of an acid and advantageously purified as described in Example 1. It melts in a pure state at 252° and corresponds to the formula:

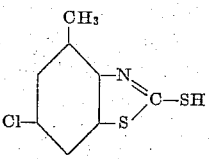

Example 3

25 parts of the reaction product of disulfur-dichloride and ortho-anisidine are hydrolyzed by means of water and the compound thus obtained is introduced into a solution of 80 parts of crystallized sodium sulfide in 400 parts of water. After the addition of 25 parts of carbon disulfide the mass is warmed for some time, some carbon-disulfide being gradually further added. The reaction product is precipitated by the addition of common salt and purified as described above. In this manner the new 2-mercapto-4-methoxy-6-chloro-benzothiazole is obtained. It melts in a pure state at 233° and corresponds probably to the formula:

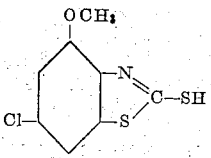

In an analogous manner 22 parts of the reaction product of disulfur-dichloride and aniline yield 2-mercapto-6-chloro-benzo-thiazole melting when pure at 253°.

Example 4

50 parts of the reaction product of disulfur-dichloride and β-naphthylamine or the equivalent amount of its conversion product prepared by means of water are boiled with a solution of 160 parts of crystalized sodium sulfide in 800 parts of water and 20 parts of carbon-disulfide under a reflux condenser for some hours, 10 parts of carbon-disulfide being advantageously added after some time. When cool the reaction product crystallized is filtered off from the mass, and dissolved in about 500 parts of warm water. From this solution the mercaptan is precipitated by means of dilute hydrochloric acid. It corresponds probably to the formula:

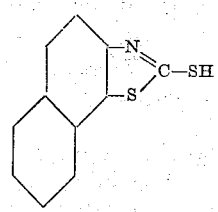

It crystallizes from benzene in colorless needless melting at about 235° as described by Jakobsen and Frankenbacher (Berichte der deutschen chemischen Gesellschaft, vol. 24, page 1408).

Example 5

178 parts of the reaction product of disulfur-dichloride and α-naphthylamine are boiled with a solution of 320 parts of sodium sulfide in 1600 parts of water and 40 parts carbon-disulfide under a reflux condenser for some hours, about 10 parts of carbon-disulfide being advantageously added after some time. The mass is worked up as described in the foregoing example. The new chloro-naphtho-thiazole-mercaptan of the probable formula:

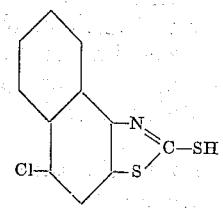

represents, when recrystallized from trichloro-benzene yellowish crystals melting at 304°.

Example 6

38 parts of the reaction product of disulfur-dichloride and benzidine are introduced into a solution of 80 parts of sodium sulfide in 800 parts of water and the mixture is boiled with the addition of 40 parts of carbon-disulfide under a reflux condenser for 6 hours. After cooling the reaction product is precipitated by acidifying the mass. By dissolving it in hot aqueous ammonia and precipitating the solution with an acid the new 2.2'-dimercapto-6.6'-dibenzothiazole is obtained. It corresponds probably to the formula:

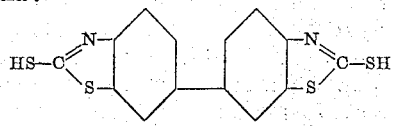

and represents yellowish crystals not melting till 300°.

Example 7

The reaction product of disulfur-dichloride and anthranilic acid is condensed with aniline as mentioned in the U. S. Patent No. 1,637,023. 30 parts of this condensation product are ground with 150 parts of alcohol and this paste is introduced into a solution of 80 parts of crystallized sodium sulfide in 80 parts of water. After shortly boiling the mass under a reflux condenser the spirit is distilled off. Then 25 parts of carbon disulfide are added and the whole is warmed for some time while further adding small amounts of carbon-disulfide. Therefrom the reaction product is precipitated in the cold by acidifying and purified in the customary manner. Thereby the 2-mercapto-6-phenyl-amino-benzothiazole-4-carboxylic acid of the probable formula:

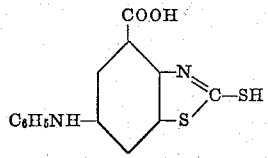

is obtained. It melts while being decomposed at 300-305°.

Example 8

25 parts of the reaction product of disulfur-dichloride and ortho-toluidine or of the corresponding conversion product prepared therefrom by means of water are introduced into a solution of 80 parts of crystallized sodium sulfide in 80 parts of water. After the addition of 40 parts of potassium xanthogenate the mass is boiled under a reflux condenser for some time. When the reaction is finished the reaction mass is cooled. Thereby the reaction product separates in bright crystals. They are filtered off, washed with a solution of common salt and purified in the customary manner. The product thus obtained is identical with that described in Example 2.

In an analogous manner 4.6-dichloro-2-mercapto-benzothiazole is obtained by starting from the reaction product of disulfur dichloride and ortho-chloroaniline. The new product crystallizes from for instance nitrobenzene as yellow needles, melting at about 230°.

The reaction product of disulfur-dichloride and anthranilic acid and para-mono-acet-phenylene-diamine yield 6-chloro-2-mercapto-benzothiazole-4-carboxylic acid and 2-mercopto-6-acetamino-benzothiazole respectively of about 260° melting point.

We claim:—

1. A process which comprises acting with a thiocarbonic acid compound of the general formula:

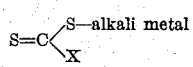

wherein X means -O-alkali metal, -S-alkali metal or -O-alkyl, in presence of an alkali on an arylene-thiazthionium compound of the probable general formula:

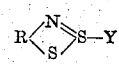

wherein Y means chlorine or hydroxyl and R means a radical of the phenylene or naphthylene series which may contain further substituents selected from the group consisting of halogen, alkyl, oxalkyl, carboxylic acid, acylamino and phenylamino.

2. A process which comprises acting with a thiocarbonic acid compound of the general formula:

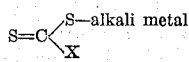

wherein X means -O-alkali metal, -S-alkali metal or -O-alkyl, in presence of an alkaline reducing agent on an arylene-thiazthionium compound of the probable general formula:

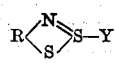

wherein Y means chlorine or hydroxyl and R means a radical of the phenylene or naphthylene series which may contain further substituents selected from the group consisting of halogen, alkyl, oxalkyl, carboxylic acid, acylamino and phenylamino.

3. A process which comprises acting with a thiocarbonic acid compound of the general formula:

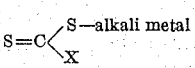

wherein X means -O-alkali metal, -S-alkali metal or -O-alkyl produced in situ in presence of an alkali on an arylene-thiazthionium compound of the probable general formula:

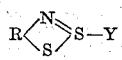

wherein Y means chlorine or hydroxyl and R means a radical of the phenylene or naphthylene series which may contain further substituents selected from the group consisting of halogen, alkyl, oxalkyl, carboxylic acid, acylamino and phenylamino.

4. A process which comprises acting with a thiocarbonic acid compound of the general formula:

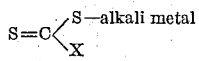

wherein X means -O-alkali metal, -S-alkali metal or -O-alkyl produced in situ in presence of an alkaline producing agent on an arylene-thiazthionium compound of the probable general formula:

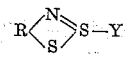

wherein Y means chlorine or hydroxyl and R means a radical of the phenylene or naphthylene series which may contain further substituents selected from the group consisting of halogen, alkyl, oxalkyl, carboxylic acid, acylamino and phenylamino.

5. A process which comprises acting with an alkali metal salt of the trithiocarbonic acid in presence of an alkali and a reducing agent on an arylene-thiazthionium compound of the probable general formula:

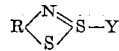

wherein Y means chlorine or hydroxyl and R means a radical of the phenylene or naphthylene series which may contain further substituents selected from the group consisting of halogen, alkyl, oxyalkyl, carboxylic acid, acylamino and phenylamino.

6. A process which comprises acting with an alkali sulfide and carbon disulfide on an arylene-thiazthionium compound of the probable general formula:

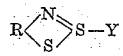

wherein Y means chlorine or hydroxyl and R means a radical of the phenylene or naphthylene series which may contain further substituents selected from the group consisting of halogen, alkyl, oxyalkyl, carboxylic acid, acylamino and phenylamino.

7. As new compounds mercapto-benzo-thiazole-compounds corresponding probably to the general formula:

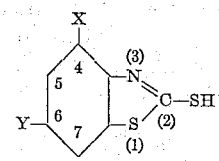

wherein X means halogen, an alkyl-, oxalkyl- or carboxylic-acid group, Y means halogen, an oxalkyl-, arylamino- or acylamino-group.

8. As new compounds mercaptobenzo-thiazole compounds corresponding probably to the general formula:

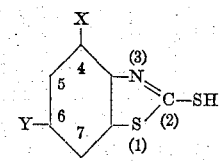

wherein X means halogen or an alkyl- or oxalkyl-group and Y means halogen.

9. As new compounds mercapto-benzo-thiazole-compounds corresponding probably to the general formula:

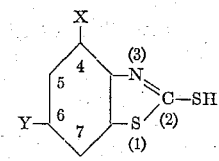

wherein X means an alkyl- or oxalkyl-group and Y means halogen.

10. As a new compound the 2-mercapto-4-methoxy-6-chloro-benzothiazole of the probable formula:

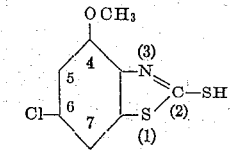

melting in a pure state at about 233° C.

In testimony whereof, we affix our signatures.

RICHARD HERZ.
MAX SCHUBERT.
WERNER ZERWECK.